(12) United States Patent
Tazume

(10) Patent No.: US 11,875,689 B2
(45) Date of Patent: Jan. 16, 2024

(54) MANAGEMENT APPARATUS, MANAGEMENT METHOD AND MANAGEMENT SYSTEM

(71) Applicant: RAKUTEN GROUP, INC., Tokyo (JP)

(72) Inventor: Toshiaki Tazume, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 17/129,774

(22) Filed: Dec. 21, 2020

(65) Prior Publication Data

US 2021/0110723 A1 Apr. 15, 2021

Related U.S. Application Data

(63) Continuation-in-part of application No. PCT/JP2019/031340, filed on Aug. 8, 2019.

(51) Int. Cl.
| | |
|---|---|
| G08G 5/00 | (2006.01) |
| G05D 1/10 | (2006.01) |
| G08G 5/04 | (2006.01) |

(52) U.S. Cl.
CPC .......... *G08G 5/0043* (2013.01); *G05D 1/106* (2019.05); *G08G 5/003* (2013.01); *G08G 5/045* (2013.01)

(58) Field of Classification Search
CPC ...... G08G 5/0043; G08G 5/003; G08G 5/045; G05D 1/106
See application file for complete search history.

(56) References Cited

U.S. PATENT DOCUMENTS

| | | | | |
|---|---|---|---|---|
| 9,262,929 | B1* | 2/2016 | Roy | G08G 5/0034 |
| 10,553,122 | B1* | 2/2020 | Gilboa-Amir | G06Q 10/0832 |
| 10,580,311 | B2* | 3/2020 | Schmalzried | G05D 1/104 |
| 10,679,509 | B1* | 6/2020 | Yarlagadda | G06N 20/20 |
| 2015/0379874 | A1* | 12/2015 | Ubhi | G01S 5/0027 |
| | | | | 701/3 |
| 2016/0217694 | A1 | 7/2016 | Batla et al. | |
| 2016/0357183 | A1* | 12/2016 | Shaw | G05D 1/0027 |
| 2019/0103032 | A1 | 4/2019 | Sasaki | |
| 2019/0286124 | A1* | 9/2019 | Schubert | B64C 39/024 |
| 2019/0361434 | A1 | 11/2019 | Ohtsuji et al. | |
| 2020/0346662 | A1 | 11/2020 | Suzuki et al. | |

FOREIGN PATENT DOCUMENTS

| | | |
|---|---|---|
| JP | 2019-026121 A | 2/2019 |
| JP | 2019-049874 A | 3/2019 |
| JP | 2019-053501 A | 4/2019 |
| JP | 2019-067252 A | 4/2019 |
| KR | 10-2018-0075894 A | 7/2018 |
| WO | 2018/116486 A1 | 6/2018 |
| WO | 2019/093190 A1 | 5/2019 |

OTHER PUBLICATIONS

Yarlagadda; Pradeep Krishna, Autonomous UAV Obstacle Avoidance Using Machine Learning From Piloted UAV Flights U.S. Appl. No. 10/679,509-B1, Jun. 2020 (Year: 2016).*

* cited by examiner

*Primary Examiner* — Frederick M Brushaber

(74) *Attorney, Agent, or Firm* — HEA LAW PLLC

(57) ABSTRACT

A management device that manages a flight route of a plurality of unmanned aerial vehicles (UAVs) includes a communication unit that acquires a detection result of an obstacle by a first UAV including an obstacle detection function and an evaluating unit that generates evaluation data of the flight route for selecting a UAV to fly on the flight route based on the detection result.

16 Claims, 19 Drawing Sheets

FIG.5

| STANDARD:1000 | $P_1$ | $P_2$ | ... | $P_b$ | ... | $P_{N-1}$ | $P_N$ |
|---|---|---|---|---|---|---|---|
| ROUTE SCORE | 0 | 0 | ... | +1 | ... | 0 | 0 |
| ROUTE ID | 1000 | | | | | | |

FIG.6

| STANDARD:1000 | $P_1$ | $P_2$ | ... | $P_a$ | ... | $P_{N-1}$ | $P_N$ |
|---|---|---|---|---|---|---|---|
| ROUTE SCORE | 0 | 0 | ... | +10 | ... | 0 | 0 |
| ROUTE ID | 1000 | | | 1001 | | | |

FIG.7

| STANDARD:1000 | $P_1$ | $P_2$ | ... | $P_a$ | ... | $P_d$ | ... | $P_{N-1}$ | $P_N$ |
|---|---|---|---|---|---|---|---|---|---|
| ROUTE SCORE | 0 | 0 | ... | +10 | ... | +10 | ... | 0 | 0 |
| ROUTE ID | 1000 | | | 1001 | | 1002 | | | |

FIG.8

| STANDARD:1000 | $P_1$ | $P_2$ | ... | $P_a$ | ... | $P_d$ | ... | $P_{N-1}$ | $P_N$ |
|---|---|---|---|---|---|---|---|---|---|
| ROUTE SCORE | 0 | 0 | ... | 0 | ... | +10 | ... | 0 | 0 |
| ROUTE ID | 1001 | | | | | 1002 | | | |

FIG.11

| FLIGHT PATTERN | ROUTE ID | ROUTE SCORE | STANDARD FLIGHT ROUTE |
|---|---|---|---|
| a | 1000 | +1 | ○ |
| b | 1000 | – | – |

FIG.12

| FLIGHT PATTERN | ROUTE ID | ROUTE SCORE | STANDARD FLIGHT ROUTE |
|---|---|---|---|
| a | 1000 | +10 | – |
| c | 1001 | 0 | ○ |

FIG.13

| FLIGHT PATTERN | ROUTE ID | ROUTE SCORE | STANDARD FLIGHT ROUTE |
|---|---|---|---|
| a | 1000 | +20 | — |
| d | 1002 | 0 | ○ |

FIG.14

| FLIGHT PATTERN | ROUTE ID | ROUTE SCORE | STANDARD FLIGHT ROUTE |
|---|---|---|---|
| c | 1001 | +10 | – |
| d | 1002 | 0 | ○ |

FIG.15

| FLIGHT PATTERN | ROUTE ID | ROUTE SCORE | STANDARD FLIGHT ROUTE |
|---|---|---|---|
| d | 1002 | +1 | ○ |
| e | 1002 | – | – |

FIG.16

| ROUTE ID | ROUTE SCORE | ROUTE DISTANCE | STANDARD FLIGHT ROUTE |
|---|---|---|---|
| 1000 | +22 | 20 km | – |
| 1001 | +11 | 22.5 km | – |
| 1002 | +1 | 25 km | ○ |

FIG.17

| AIRCRAFT ID | FLIGHT SCORE | POSSIBLE FLIGHT DISTANCE |
|---|---|---|
| A | 0 | 120 km |
| B | 12 | 25 km |
| C | 25 | 50 km |
| D | 60 | 105 km |
| E | 108 | 180 km |

MANAGEMENT APPARATUS, MANAGEMENT METHOD AND MANAGEMENT SYSTEM

CROSS-REFERENCE TO RELATED APPLICATION

This application is a continuation-in-part application of International Application PCT/JP2019/031340 filed on Aug. 8, 2019. The content of this application is incorporated herein by reference in its entirety.

BACKGROUND

1. Field

The present invention relates to a management device, a management method and a management system.

2. Description of the Related Art

There are known techniques for providing an unmanned aerial vehicle (UAV) with the function to detect obstacles and to change the flight route according to the obstacles detected by the UAV. For example, JP2019-53501A describes, when an obstacle is detected on a first flight route, generating a second flight route in order to avoid the obstacle and notifying information on the obstacle or the second flight route to the device that manages another flying device. JP2019-49874A describes setting a flight route for avoiding a detected obstacle if the obstacle is an immovable object, and making the flight device to wait if the detected obstacle is a moving object (e.g., bird).

However, risks such as obstacles on flight routes may not be adequately evaluated. If multiple UAVs are available in such flight routes, a suitable UAV may differ for each flight route. In order to select a more appropriate UAV, providing evaluation data of flight routes has been desired.

In view of the above, in the present disclosure, evaluation data of a flight route is generated based on a detection result of an obstacle. The present disclosure provides a technique that allows an appropriate UAV to be used for flight based on the evaluation data of the flight route.

SUMMARY

In response to the above described issues, a management device according to the present invention that manages a flight route of a plurality of unmanned aerial vehicles (UAVs) includes at least one processor configured to acquire a detection result of an obstacle by a first UAV including an obstacle detection function, and generate evaluation data of the flight route for selecting a UAV to fly on the flight route based on the detection result.

In one aspect of the present invention, the at least one processor configured to generate the evaluation data based on whether an obstacle is detected in the acquired detection result.

In one aspect of the present invention, the at least one processor configured to generate the evaluation data based on a type of an obstacle detected in the acquired detection result.

In one aspect of the present invention, in a case where the first UAV flies on a second flight route so as to avoid an obstacle detected during flight of the first flight route, the at least one processor is configured to generate both the evaluation data of the first flight route and the evaluation data of the second flight route.

In one aspect of the present invention, the at least one processor is configured to generate the evaluation data in which a route score is associated with the flight route, and the at least one processor is configured to select a UAV to fly on the flight route based on the route score assigned to the flight route and a flight score that is set for each UAV in advance.

In one aspect of the present invention, the at least one processor is configured to select a second UAV including no obstacle detecting function as a UAV that flies on the flight route to which the route score indicating that an obstacle is unlikely to exist on the flight route is assigned.

A management method according to the present invention that manages a flight route of a plurality of UAVs includes acquiring a detection result of an obstacle by a first UAV including an obstacle detection function, and generating evaluation data of the flight route for selecting a UAV to fly on the flight route based on the detection result.

A management system according to the present invention that manages a flight route of a plurality of UAVs includes a first UAV including an obstacle detection function, and a management device comprising at least one processor configured to acquire a detection result of an obstacle by the first UAV, and generate evaluation data of the flight route for selecting a UAV to fly on the flight route based on the detection result.

In one aspect of the present invention, the at least one processor is configured to update the generated evaluation data based on the detection result.

In one aspect of the present invention, the at least one processor is configured to update the generated evaluation data in each flight of a plurality of UAVs.

In one aspect of the present invention, the at least one processor is configured to update the generated evaluation data of the flight route according to a period during the flight route is not flown by the plurality of UAVs.

In one aspect of the present invention, the at least one processor is configured to generate the evaluation data based on whether the obstacle is a moving object or an immovable object.

In one aspect of the present invention, the flight score is set based on at least one of (i) size of range to detect obstacles by the UAV, (ii) distance of range to detect obstacles by the UAV, (iii) type of a device mounted on the UAV to detect obstacles, and (iv) whether a device is mounted on the UAV to detect obstacles.

BRIEF DESCRIPTION OF THE DRAWINGS

FIG. 5 shows flight status information of the UAV flying in a flight pattern b;

FIG. 6 shows flight status information of the UAV flying in a flight pattern c;

FIG. 7 shows flight status information of the UAV flying in a flight pattern d;

FIG. 8 shows flight status information of the UAV flying in flight pattern d;

FIG. 11 shows an example of evaluation of flight routes and update of the standard flight route when flying between two points;

FIG. 12 shows an example of evaluation of flight routes and update of the standard flight route when flying between two points;

FIG. 13 shows an example of evaluation of flight routes and update of the standard flight route when flying between two points;

FIG. 14 shows an example of evaluation of flight routes and update of the standard flight route when flying between two points;

FIG. 15 shows an example of evaluation of flight routes and update of the standard flight route when flying between two points;

FIG. 16 shows an example of route information in a plurality of route IDs generated as flight routes between two points;

FIG. 17 shows an example of aircraft information of the UAV stored in the server;

DETAILED DESCRIPTION

An example of an unmanned aerial vehicle (UAV) control system according to an embodiment of the present invention will be described below.

Figure 1:
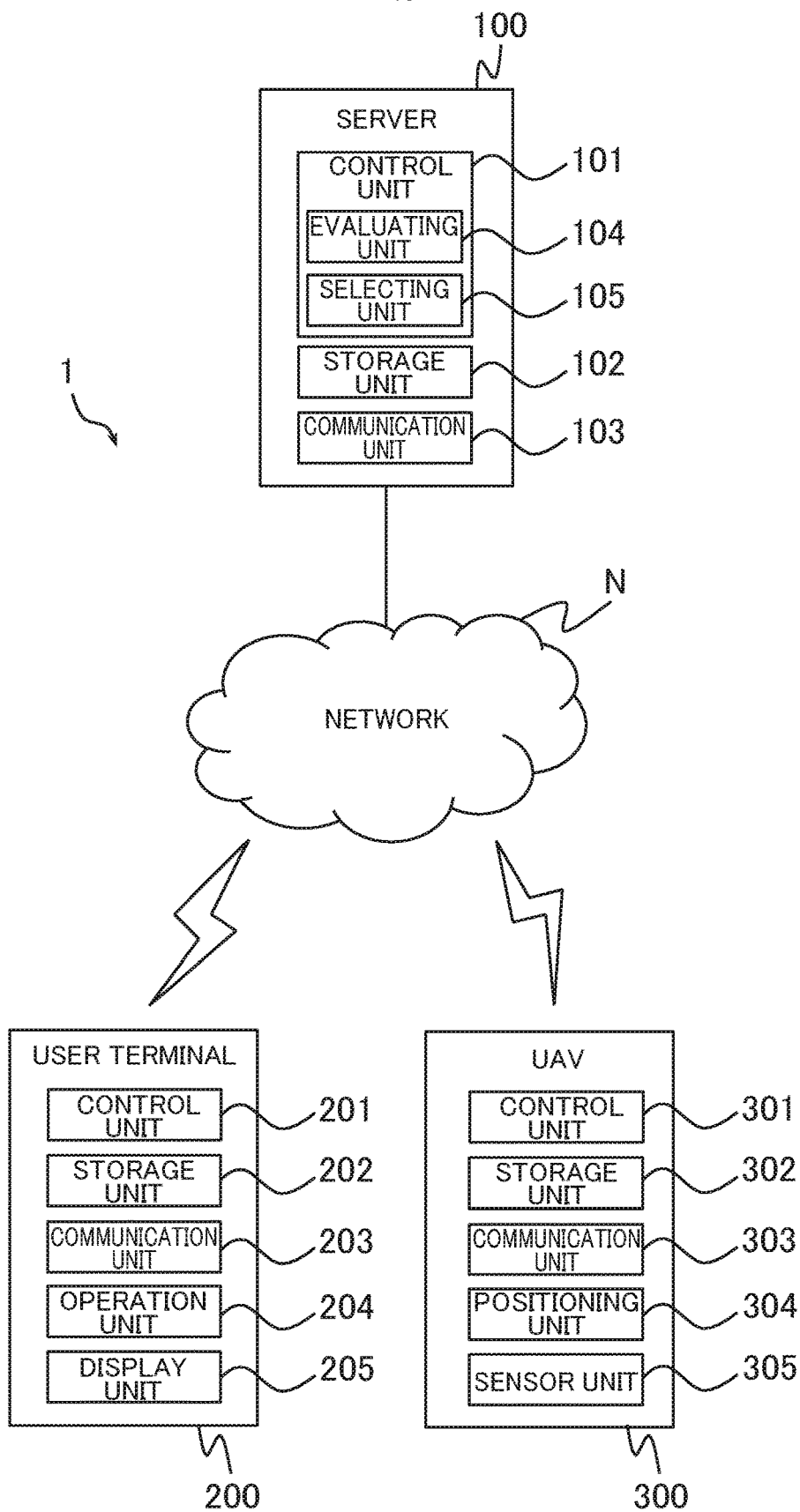
FIG. 1 is a diagram illustrating an overall configuration of a flight route management system.

FIG. 1 is a diagram illustrating an overall configuration of a flight route management system 1. As shown in FIG. 1, the flight route management system 1 includes a server 100, a user terminal 200, and a UAV 300. The server 100, the user terminal 200, and the UAV 300 are connected to a network N. FIG. 1 shows one server 100, one user terminal 200, and one UAV 300, although the number of each of them may be two or more.

The server 100 is a managing device that manages a flight route in which a plurality of UAVs fly. For example, server 100 is a server computer. The server 100 includes a control unit 101, a storage unit 102, and a communication unit 103.

The control unit 101 includes at least one microprocessor, and executes processing according to programs and data stored in the storage unit 102. The storage unit 102 includes a main storage unit and an auxiliary storage unit. For example, the main storage unit is a volatile memory such as RAM, and the auxiliary storage unit is a nonvolatile memory such as ROM, EEPROM, flash memory, and hard disk. The communication unit 103 is a communication interface for wired or wireless communication and performs data communication over the network N.

An evaluating unit 104 shows one of the functions of the control unit 101 and evaluates a flight route. Specifically, based on route information of the flight route acquired from the UAV 300 via the communication unit 103, the evaluating unit 104 generates evaluation data of such a flight route. The evaluating unit 104 also sets and updates a standard flight route based on the generated evaluation data of the flight route. The generation of the evaluation data of the flight route and the setting and updating the standard flight route will be described later.

A selecting unit 105 indicates one of the functions of the control unit 101, and selects the UAV 300 recommended to be used for the flight of the flight route. Specifically, the selecting unit 105 selects a UAV 300 to be recommended for use in flight based on the evaluation data of the flight route (in particular, the standard flight route) generated by the evaluating unit 104. The selection of a UAV 300 will also be described later.

The user terminal 200 is a computer operated by a user. For example, the user terminal 200 is a mobile phone (including a smart phone), a portable information terminal (including a tablet computer), or a personal computer. In this embodiment, the user terminal 200 includes a control unit 201, a storage unit 202, a communication unit 203, an operation unit 204, and a display unit 205. The hardware configurations of the control unit 201, the storage unit 202, and the communication unit 203 may be the same as the hardware configurations of the control unit 101, the storage unit 102, and the communication unit 103, respectively.

The operation unit 204 is an input device, and is, for example, a pointing device such as a touch panel and a mouse, a keyboard, or a button. The operation unit 204 transmits an operation of the user to the control unit 201. The display unit 205 is, for example, a liquid crystal display unit or an organic EL display unit. The display unit 205 displays images according to an instruction from the control unit 201.

The UAV 300 (first UAV) is an aircraft without a man on board, for example, an unmanned aerial vehicle driven by a battery (so-called drone) or an engine. The UAV 300 may be capable of carrying a package such as merchandise and mail. The UAV 300 flies for the purpose of, for example, delivering packages to a delivery destination, or collecting packages from a pickup destination.

As will be described later, the UAV 300 may fly for various purposes, and may fly for purposes other than transportation of packages, such as, photographing, detecting weather information, security, or pesticide spraying. The UAV 300 includes a control unit 301, a storage unit 302, a communication unit 303, a positioning unit 304, and a sensor unit 305. The UAV 300 also includes propellers, a motor, a battery, and an antenna, but the description of these will be omitted here.

The hardware configurations of the control unit 301, the storage unit 302, and the communication unit 303 may be the same as the hardware configurations of the control unit 101, the storage unit 102, and the communication unit 103, respectively. The communication unit 303 may include a wireless communication interface for a particular device (e.g., a so-called radio-controlled device), such as FASST, FHSS, DMSS, and AFHSS, and the UAV 300 may be controlled by wirelessly communicating with a controller via the communication unit 103.

The positioning unit 304 includes at least one positioning sensor, such as a GPS sensor. The GPS sensor includes a receiver that receives a signal from the satellite, and detects position information based on the signal received by the receiver, for example. The position information is, for example, latitude/longitude information or coordinate information, and may indicate a two-dimensional position on the ground, or may indicate a three-dimensional position including an altitude. The UAV 300 may include any positioning sensor, and the positioning unit 304 may include any sensor such as an acceleration sensor, gyro sensor, wind sensor, geomagnetic sensor, altitude sensor, displacement sensor, pressure sensor, infrared ray sensor, laser sensor, ultrasonic sensor, and temperature sensor.

The UAV 300 flies while comparing the position information acquired by the positioning unit 304 with the acquired route information. In this manner, the UAV compares the position information with the route information during flight, thereby checking whether the UAV 300 is flying within the route range included in the route information. As such, for example, if the UAV 300 is about to deviate from the route range due to temporary strong wind, the autonomous control is performed so as not to deviate from the route range set from the trajectory obtained based on the position information.

The sensor 305 includes at least one object detection sensor or one camera. The object detection sensor detects reflection of waves such as emitted acoustic wave, thereby detecting an object in the direction of the acoustic wave. The camera includes an image pickup device such as a CCD image sensor and a CMOS image sensor, and records an image captured by the image pickup device as digital data. The image may be a still image or a moving image continuously shot at a predetermined frame rate. In a case where the camera is used as a sensor, objects such as birds and buildings are detected by using an image recognition technique commonly used in captured images. The sensor unit 305 may include both an object detection sensor and a camera.

Figure 2:
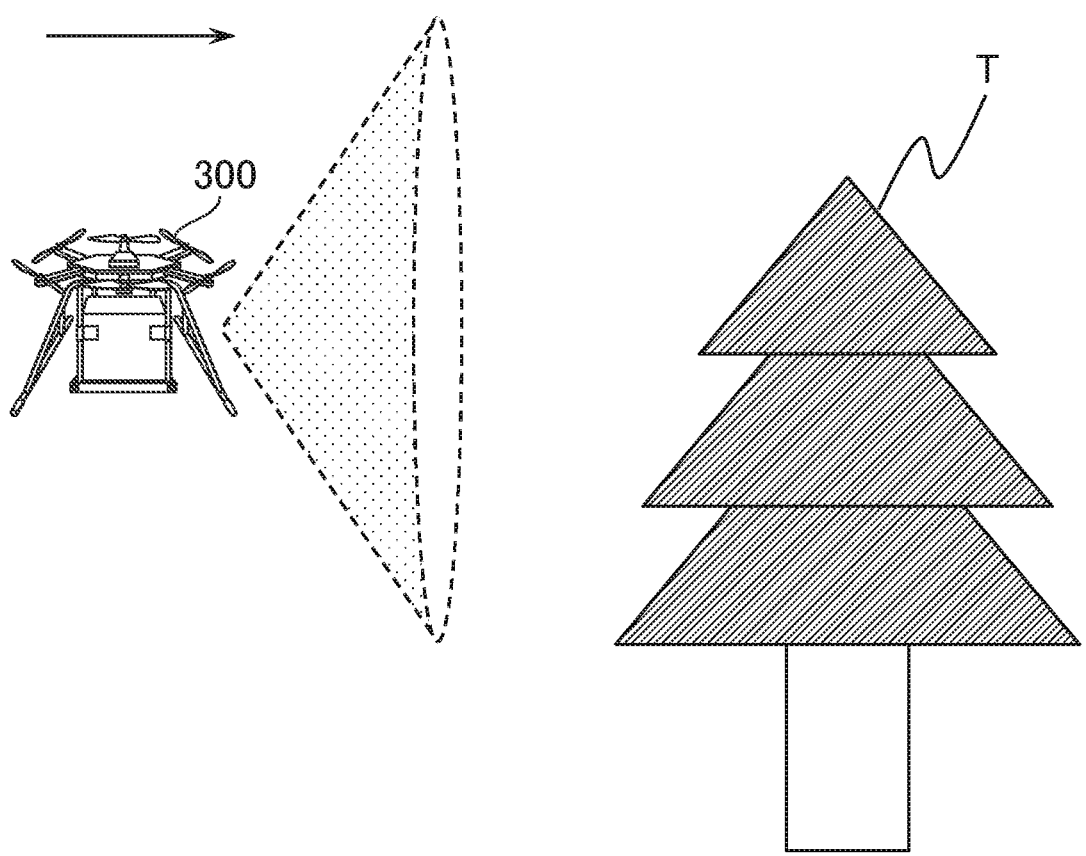
FIG. 2 is a diagram illustrating an example how an obstacle is detected by a UAV.

FIG. 2 illustrates an example how an obstacle is detected by the UAV 300. Here, a tree T is taken as an example of a stationary obstacle (immovable object). A traveling direction of the UAV 300 is a direction indicated by the arrow. In FIG. 2, the tree T exists in the traveling direction of the UAV 300. At this time, the sensor unit 305 included in the UAV 300 detects a reflected wave bouncing from the tree T among waves (e.g., radar waves) emitted by the sensor unit 305 in the traveling direction. Subsequently, based on the time at which the wave is emitted and the time at which the reflected wave is detected, the existence of the tree T as an obstacle and a distance between the tree T and the UAV 300 are determined.

The hardware configurations of the server 100, the user terminal 200, and the UAV 300 are not limited to the example shown in FIG. 1, and various types of hardware can be applied. For example, each of the server 100, the user terminal 200, and the UAV 300 may include a reader (e.g., a memory card slot and optical disk drive) that reads a computer readable information storage medium. Further, each of them may include an input/output unit for communicating with external devices (e.g., USB port). The programs and data described as being stored in each device may be supplied via the reader or the input/output unit, or may be supplied via the network N, for example.

Figure 3:
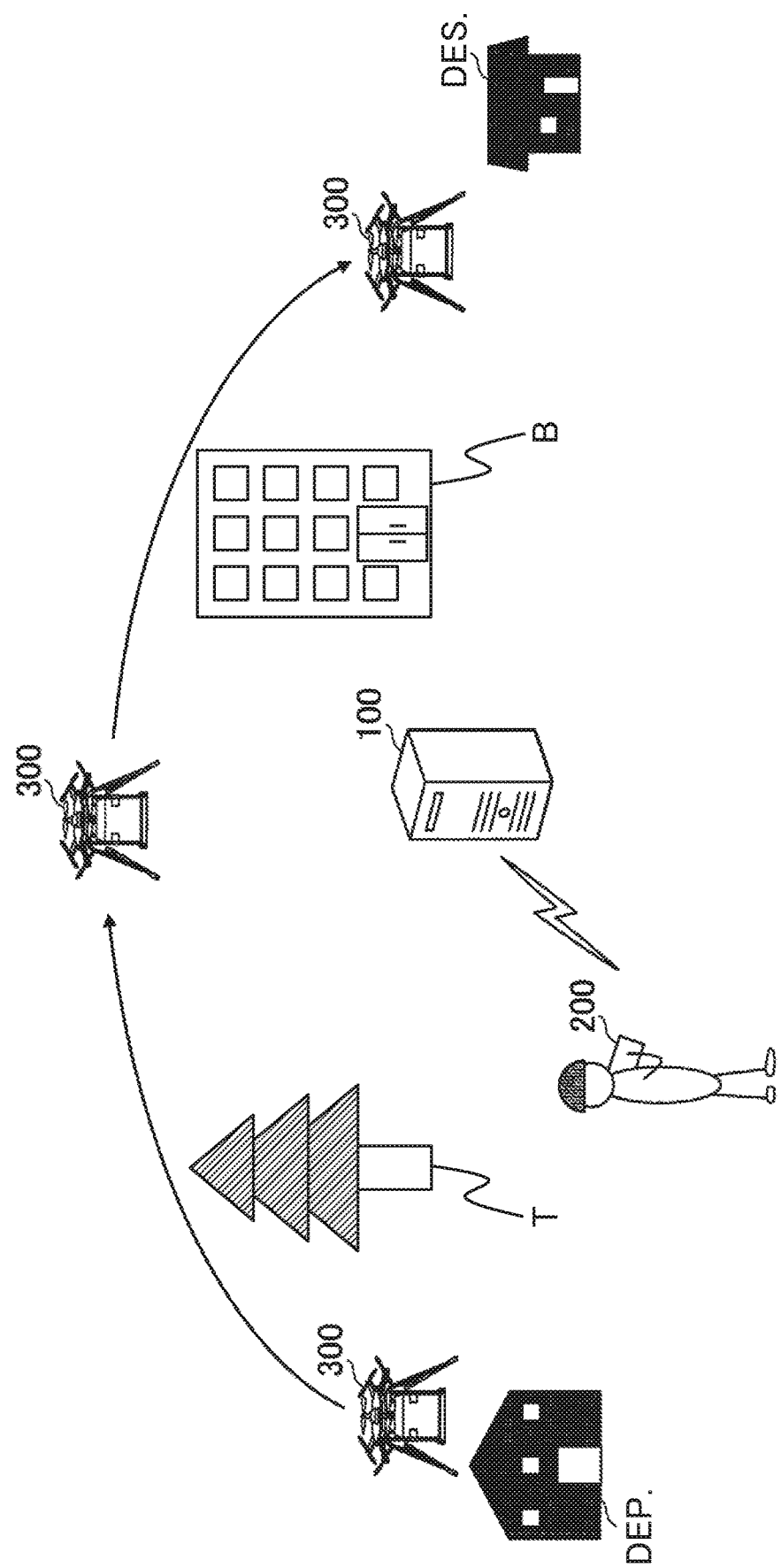
FIG. 3 is a diagram illustrating an example how the UAV flies.

FIG. 3 illustrates an example how the UAV 300 flies through a flight route approved by the unmanned aerial vehicle control system 1. In FIG. 3, a case is described in which the tree T and a building B as obstacles exist on the flight route. The flight route in FIG. 3 substantially corresponds to a flight route ID:1002 (flight patterns d and e) described later.

As shown in FIG. 3, a user has a user terminal 200, which is a tablet computer, for example. The user enters a flight request by using the user terminal 200. The flight request includes departure/destination coordinate information indicating a departure point DEP and destination point DES, and includes departure time information. Here, the departure point DEP is a point at which the UAV 300 starts flight, and the destination point DES is a point at which the UAV 300 ends flight. The departure time information is information indicating the time at which the UAV 300 starts flight. The flight request entered into the user terminal 200 is sent by the communication unit 203 over the network N to the server 100.

Here, the server 100 functions as an information processing device that provides information and processing results in response to a request such as the flight request acquired from the user terminal 200. Based on the flight request received by the communication unit 103, the control unit 101 of the server 100 calls route information (flight route plan) in a standard flight route stored in the storage unit 102. The route information includes a route ID of a flight route stored as a standard flight route in the storage unit 102. The server 100 transmits the route information called from the storage unit 102 by the communication unit 103 via the network N to the user terminal 200.

The user checks the route information transmitted from the server 100 on the display unit 205 of the user terminal 200. When the user confirms that no problem is found in the route information and performs a confirmation operation, the communication unit 203 of the user terminal 200 transmits a signal indicating that the confirmation operation is performed by the user through the network N to the server 100. The control unit 101 of the server 100 accepts the flight request by receiving the signal from the communication unit 103. Subsequently, at the departure time included in the flight request, the UAV 300 flies by autonomous flight from the departure point DEP to the destination point DES.

Figure 4:
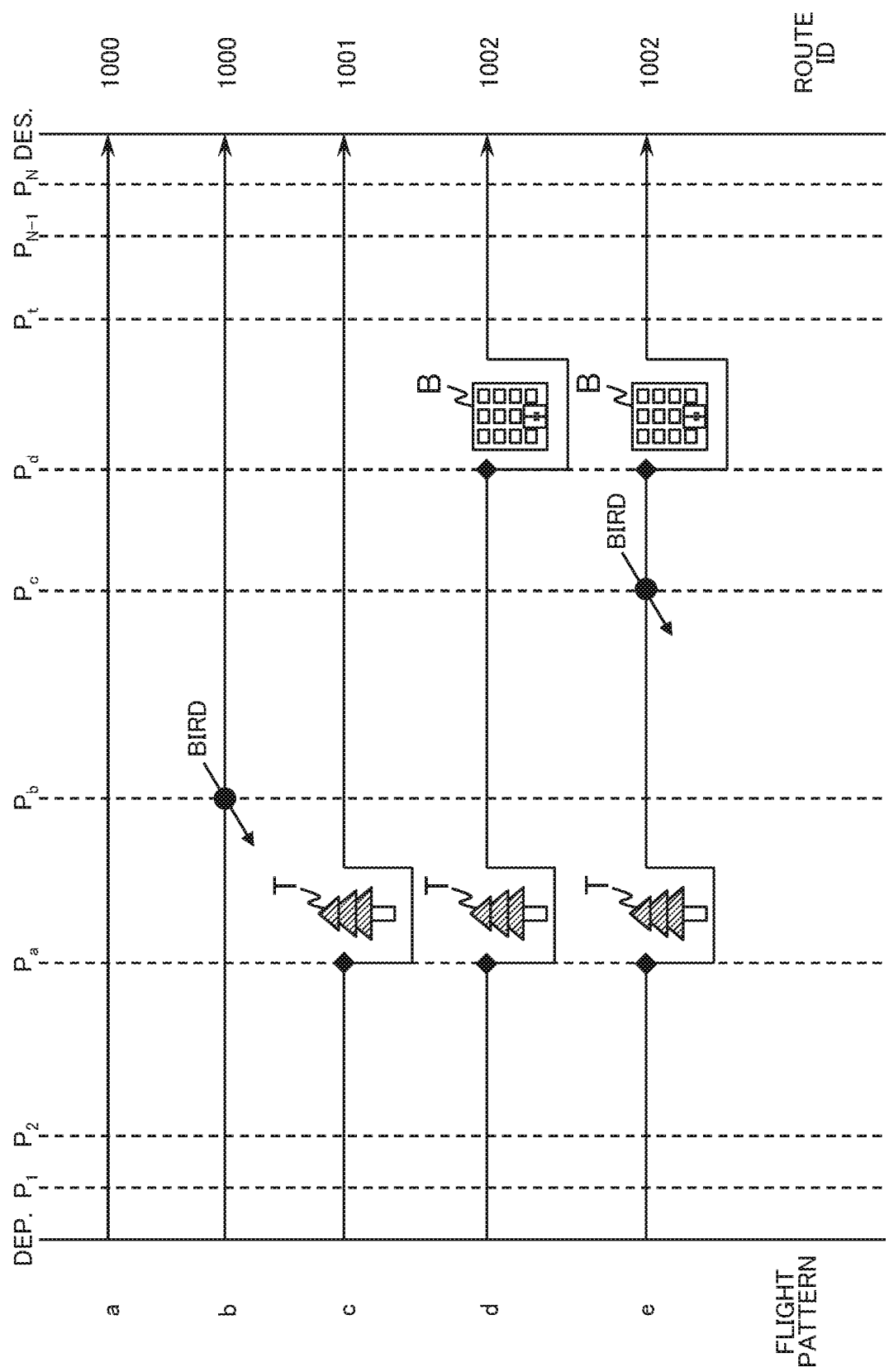
FIG. 4 is a schematic view of a flight route when the UAV flies between two points.

FIG. 4 is a schematic view of the flight route when the UAV 300 flies between two points. The positioning unit 304 of the UAV 300 generates, for example, its three-dimensional coordinate data as telemetry data during flight. The generated telemetry data of the UAV 300 is sequentially transmitted to the server 100 via the network N by the communication unit 303. As such, the three-dimensional coordinate information of the UAV 300 is indicated as position information $P_1, P_2, \ldots P_t, \ldots P_N$, respectively, corresponding to the time point at which the telemetry data is generated.

In FIG. 4, five flight patterns a to e are shown as the flight patterns between the two points, the departure point DEP and the destination point DES. The flight pattern a shows the flight pattern when the UAV 300 flies through the standard flight route as per the flight request. The flight pattern b indicates a flight pattern when a bird (moving object) appears on the flight route in the position information Pb while the UAV 300 is in flight. The flight pattern c indicates a flight pattern when the tree T is located between the two points and the tree T is a stationary obstacle (immovable object) in the flight of the UAV 300. The flight pattern d indicates a flight pattern when the building B exits in addition to the tree T between the two points. The flight pattern e indicates a flight pattern when the tree T and the building B are located between the two points and a bird appears on the flight route in the position information $P_c$ while the UAV 300 is in flight. As described above, there are two types of obstacles that can be detected by the UAV 300 during flight, i.e., moving objects such as birds and ad balloons, and immovable objects such as trees and buildings. Although the above two types of examples are described in this embodiment, the types of obstacles are not limited to these two types. In addition, the flight patterns a to e correspond to route IDs 1000 1001, or 1002. How the route IDs are determined will be described later.

The tree T is originally located at the point $P_a$, and becomes an obstacle that hinders the flight of the UAV 300 as it grows over time. The building B is not originally located at the point $P_d$, and becomes an obstacle that hinders the flight of the UAV 300 after it was built. As such, it can be said that the flight pattern a is the first flight pattern set between these two points. That is, the flight route used in the flight pattern a is the route ID:1000. As the tree T grows, the UAV 300 then flies in the flight pattern c. In other words, the flight route used in the flight pattern c is the route ID:1001. Similarly, the flight route used in the flight pattern d after the building B is build is the route ID:1002.

FIGS. 5 to 8 show flight status information of the UAV 300 flying in each flight pattern. In the following, descriptions of the respective drawings will be described in order. The flight status information includes route IDs of the standard flight route confirmed when the user made the flight request, position information, and route scores in the position information. The route scores included in the flight status information have different values depending on the types of the detected obstacles, for example, whether the obstacle is a moving object or an immovable object. The route score for each type of the obstacle is associated with each of position information by reflecting the detection result of the obstacle.

FIG. 5 shows the flight status information of the UAV 300 flying in the flight pattern b. The route ID at the first position information $P_1$ is 1000, and thus it may be determined that the route ID of the standard flight route is 1000. Here, in the position information Pb in which the sensor unit 305 of the UAV 300 detects a bird, a route score "+1" indicating detection of a moving object is recorded. However, the route is not changed from the standard flight route, the route ID is not recorded in any position information.

FIG. 6 shows the flight status information of the UAV 300 flying in the flight pattern c. In the flight pattern c as well, the flight at the start is performed in the route ID:1000. However, the flight route is changed at the position indicated by the position information $P_a$ to avoid the tree T. As such, the route ID in the position information $P_a$ in which the tree T is detected is recorded as the route ID 1001 indicating the changed flight route. Further, a root score "+10" indicating detection of the immovable object is associated with the positional information $P_a$ in which the sensor unit 305 of the UAV 300 detects the tree T. This route change method will be described later.

FIG. 7 shows the flight status information of the UAV 300 flying in the flight pattern d. In the flight pattern d as well, the flight at the start is performed in the route ID:1000. However, the route is changed at the position indicated by the position information $P_a$ to avoid the tree T. As such, the route ID in the position information $P_a$ in which the tree T is detected is recorded as the route ID 1001 indicating the changed flight route. Further, a root score "+10" indicating detection of the immovable object is associated with the positional information $P_a$ in which the sensor unit 305 of the UAV 300 detects the tree T.

Subsequently, at the position indicated by the position information $P_d$, the route is changed to avoid the building B. As such, the route ID in the position information $P_d$ in which the building B is detected is recorded as the route ID 1002 indicating the changed flight route. Further, a root score "+10" is associated with the positional information $P_d$ in which the sensor unit 305 of the UAV 300 detects the building B similarly to the position information $P_a$ where the tree T is detected.

FIG. 8 also shows the flight status information of the UAV 300 flying in flight pattern d. However, FIG. 8 shows the flight status information in which the flight is initially performed with the route ID:1001. This can also be determined from the fact that the route ID at the first position information $P_1$ is 1001. That is, this indicates that the route ID 1001 for avoiding the tree T has already been set as the standard flight route in the flight request.

Accordingly, a route change for avoiding the tree T is not performed at the position indicated by the position information $P_a$. However, the flight route is changed to avoid the building B at the position indicated by the position information $P_d$. As such, the route ID in the position information $P_d$ in which the building B is detected is recorded as the route ID 1002 indicating the changed flight route. Further, a root score "+10" is associated with the positional information $P_d$ in which the sensor unit 305 of the UAV 300 detects the building B.

As described above, whether the UAV 300 detects an obstacle corresponds to whether the route score is associated with the position information $P_t$ in which the obstacle is detected. When the UAV 300 detects an obstacle and a route score is associated with the position information $P_t$, a value of the route score associated with the position information $P_t$ differs according to the type of the detected obstacle. As such, the detection result of the obstacle corresponds to the evaluation data of the flight route.

Figure 9:
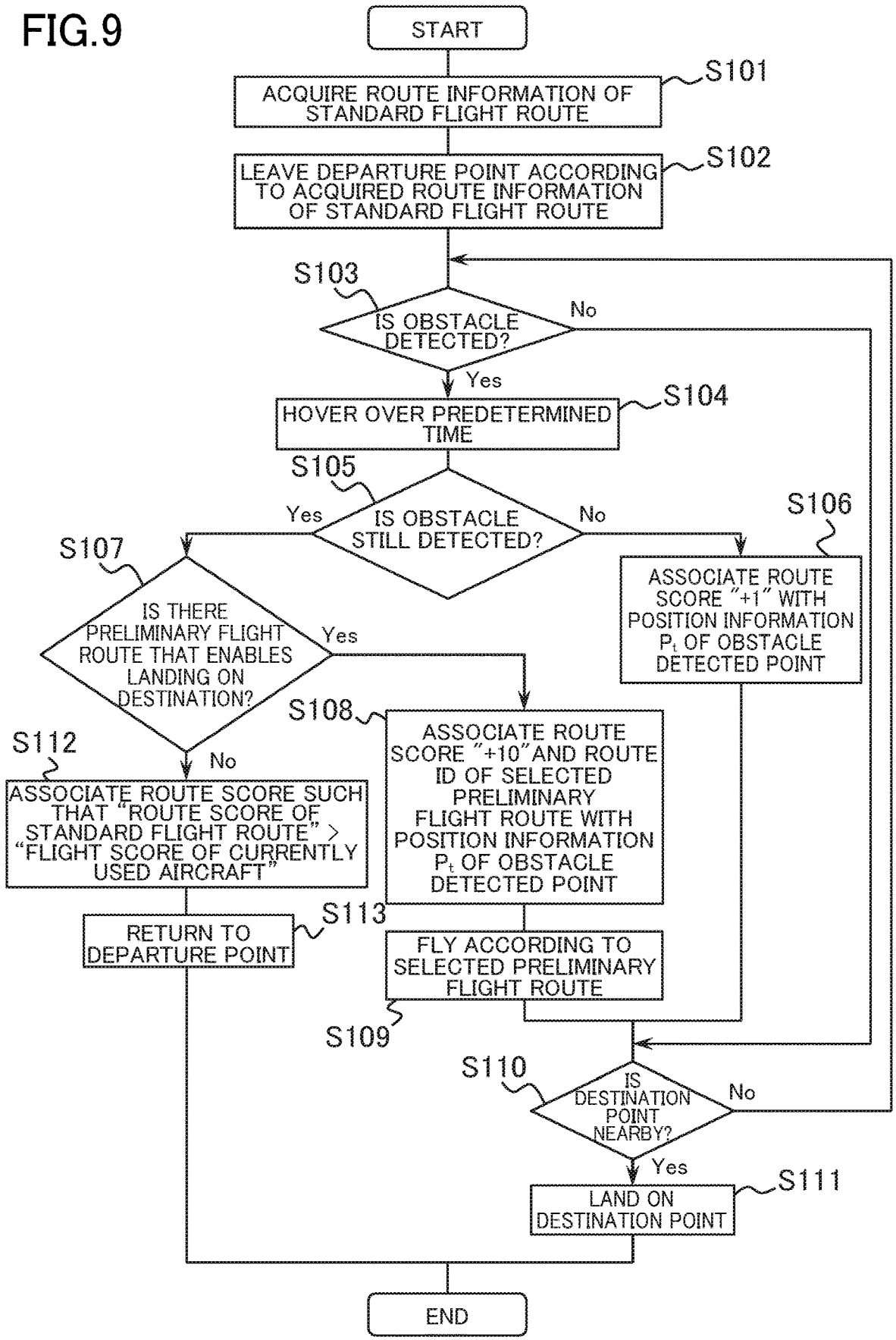
FIG. 9 is a flowchart showing how the UAV changes a route from a standard flight route.

FIG. 9 is a flowchart showing how the UAV 300 changes a route from the standard flight route (first flight route). The communication unit 203 of the user terminal 200 transmits a message indicating that the user has confirmed the route information of the standard flight route corresponding to the flight request to the server 100. Upon receiving the confirmation of the route information from the user, the communication unit 103 of the server 100 transmits the route information of the standard flight route to the UAV 300. The UAV 300 acquires the route information of the standard flight route from the server 100 (S101). Subsequently, the UAV 300 leaves the departure point DEP according to the route information of the standard flight route acquired in S101 (S102). The departure time at which the UAV 300 leaves the departure point DEP is determined in accordance with the flight request.

The UAV 300 departing from the departure point DEP flies while comparing the position information acquired by the positioning unit 304 with the acquired route information. In this flight, the UAV 300 simultaneously performs obstacle detection by the sensor unit 305 (S103).

In this obstacle detection, if the sensor unit 305 does not detect any obstacle (S103: No), the control unit 301 of the UAV 300 determines whether the UAV 300 is in the vicinity of the destination point DES (S110). The determination in S110 may be performed based on, for example, a comparison between the position information acquired by the positioning unit 304 and the acquired route information. Further, the range near the destination point DES may be determined in advance by the user. The range near the destination point DES may be determined by uniformly setting distances. For example, a circle within a radius of 50 m centered on the coordinates of the destination point DES may be set as the range in the vicinity of the destination point DES.

If it is determined that the UAV 300 is not in the vicinity of the destination point DES (S110: No), the processing returns to S103 step again and an obstacle is repeatedly detected. On the other hand, if it is determined that the UAV 300 is in the vicinity of the destination point DES (S110: Yes), the UAV 300 lands to the destination point DES and terminates the flight (S111).

In this way, the UAV 300 continues to detect an obstacle during the flight from takeoff from the departure point DEP to landing to the destination point DES. If there is no obstacle, the UAV 300 is controlled according to the flow described above. The following is a control flow of the UAV 300 when an obstacle exists.

In the obstacle detection of S103, when the sensor unit 305 detects an obstacle (S103: Yes), the UAV 300 hovers over a predetermined time at a point where the obstacle is detected (S104). The user or the server 100 may freely determine the hovering time for the UAV 300. Alternatively, a hovering time set in advance in the UAV 300 may be applied to the hovering time. During the hovering in S104, a type of the obstacle may be determined by image recognition from an image acquired by, for example, the camera included in the sensor unit 305. That is, whether the obstacle is a moving object such as a bird or a balloon, or an immovable object such as a tree or a building may be determined during the hovering of S104.

After the hovering in S104, the sensor unit 305 detects an obstacle again (S105). If no obstacle is detected in S105 (S105: No), the route score "+1" is associated with the position information $P_t$ of the point where the obstacle is detected (S106). The route score "+1" indicates that an obstacle temporarily exists on the standard flight route and then disappears. After S106, the processing proceeds to S110 described above, although the description of S110 is omitted here because it is duplicated.

If an obstacle is still detected in S105 (S105: Yes), the control unit 301 of the UAV 300 determines whether there is a preliminary flight route (second flight route) that enables landing on the destination in the predetermined preliminary flight routes (S107). The preliminary flight route may be included in the route information of the standard flight route and transmitted to the UAV 300 by the server 100, and the storage unit 302 of the UAV 300 may have the acquired preliminary flight route during the flight. Alternatively, the UAV 300 may request the server 100 to transmit route information of the preliminary flight route in the standard flight route during flight. In this case, upon receiving the request from the UAV 300 at the communication unit 103, the server 100 transmits the route information of the preliminary flight route stored in the storage unit 102 of the server 100 to the UAV 300 via the network N by the communication unit 103.

In S107, if it is determined that there is a preliminary flight route that enables landing on the destination point DES (S107: YES), the route score "+10" and the route ID of the preliminary flight route determined to be enabling landing on the destination point DES are associated with the position information $P_t$ of the point where the obstacle is detected (S108). The route score "+10" indicates that an obstacle exists on the standard flight route, and a route change to avoid the obstacle is necessary. The UAV 300 then changes the route information so as to fly according to the selected preliminary flight route from the standard flight route (S109).

After the route change to the preliminary flight route in S109, the control unit 301 of the UAV 300 determines whether the UAV 300 is in the vicinity of the destination point DES (S110). If it is determined that the UAV 300 is in the vicinity of the destination (S110: Yes), the UAV 300 lands on the destination point DES and terminates the flight (S111). On the other hand, if it is determined that the UAV 300 is not in the vicinity of the destination point DES (S110: No), the processing returns to S103 again, and the obstacle detection is repeatedly executed. In this way, similarly to the flight in the standard flight route, the UAV 300 also continues to detect an obstacle during the flight in the preliminary flight route.

In S107, if it is determined that there is no preliminary flight route that enables landing on the destination point DES (S107: No), the route score of the standard flight route is changed to be larger than a flight score of the UAV 300. Specifically, the control unit 301 associates a value, which is larger than the flight score set in the currently flying UAV 300, as the route score of the position information $P_t$ of the point where the obstacle is detected (S112). Then, the aircraft flies from the point where the obstacle is detected to the departure point DEP to return to the departure point DEP (S113). The flight score will be described later.

By controlling the UAV 300 as shown in the flowchart of FIG. 9, it is possible to change the route between the two points without directly controlling the UAV 300 by the user. If there is no preliminary flight route that enables landing on the destination point DES, the UAV 300 returns to the departure point DEP. This can prevent the UAV 300 from crashing due to a dead battery, for example. Further, a danger level of the flight route can be automatically evaluated based on the type of the obstacle on the flight route without the user's visual check. The route score of the flight route is acquired in each flight, and thus the evaluation data of the flight route can be updated in each flight.

If the moving object such as a bird does not move in S104 and is still detected as an obstacle in S105, the route score associated with the position data $P_t$ in S107 is set to be larger than the route score associated with the standard flight route. This is because, if the hovering time in S104 is longer, it is reasonable to determine that the moving object leaves the flight route. Further, this also enables the flight on the standard flight route in the next flight if no moving object is detected at the same point.

In the above case, the UAV 300 changes the route to the preliminary flight route. In this regard, for example, the route score "+5" may be associated with the preliminary flight route, and the route score "+1" may be associated with the standard flight route. Further, if no moving object is detected at the same point in the next flight, the route score associated with the standard flight route may be decremented as described later.

However, if the moving object permanently exists at the same location (e.g., a flock of birds frequently stays on the flight route), the moving object may become a permanent obstacle and be regarded as an immovable object. As such, with respect to such an exception, it is possible to adopt control of generation of evaluation data of the flight route and update of the standard flight route in the case where an immovable obstacle exists, which will be described later.

Figure 10:
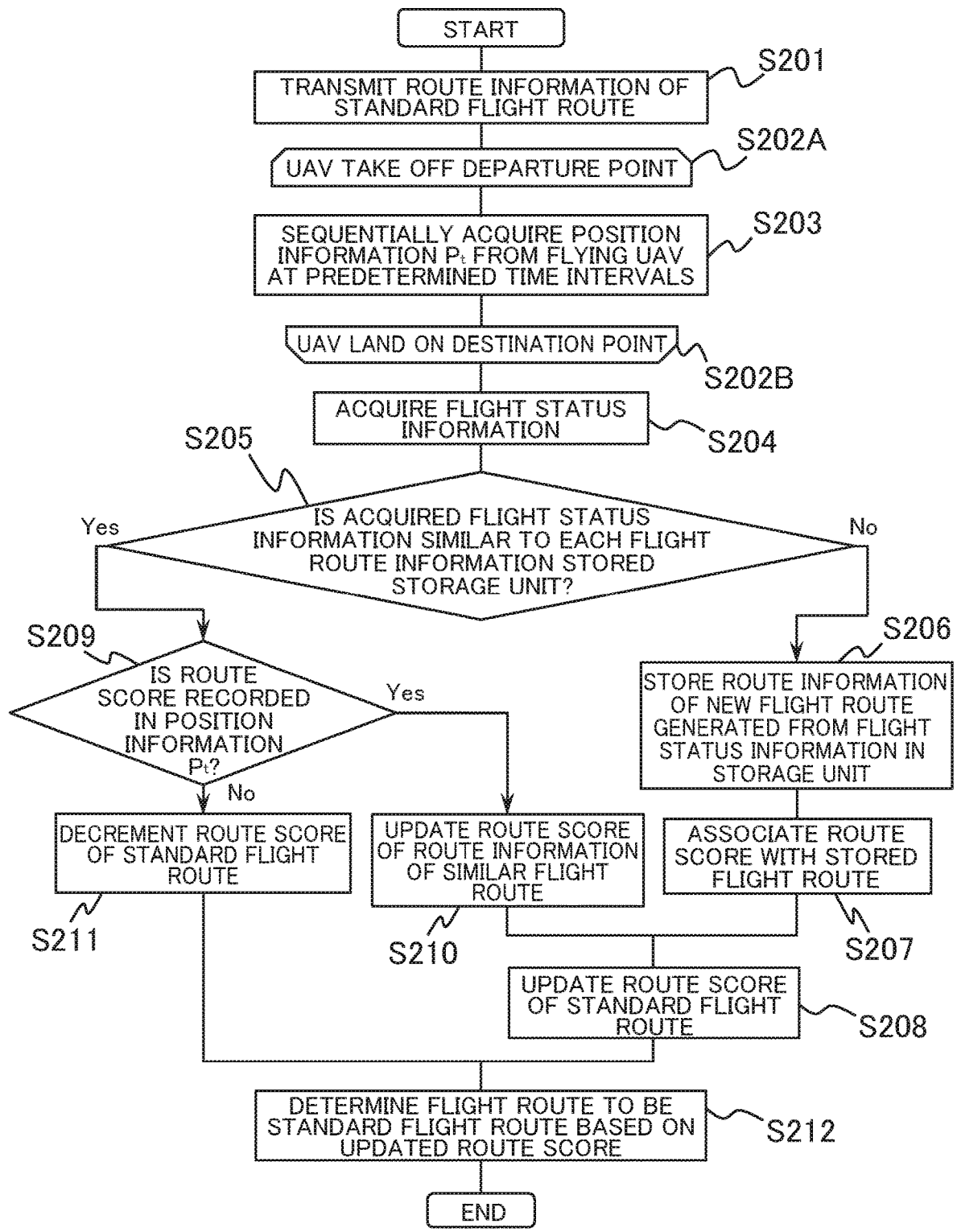
FIG. 10 is a flowchart showing control of evaluation of a flight route and update of the standard flight route in a server.

FIG. 10 is a flowchart showing the control of the evaluation data of the flight route and the update of the standard flight route in the evaluating unit 104 of the server 100. FIGS. 11 to 15, which will be described later, are examples of results obtained according to the flowchart shown in FIG. 10.

After approving the flight request, the server 100 transmits the route information of the standard flight route to the UAV 300 by the communication unit 103 (S201). While the UAV 300 takes off the departure point DEP (S202A) and lands on the destination point DES (S202B), the communication unit 103 of the server 100 sequentially acquires the position information $P_t$ from the UAV 300 at predetermined time intervals (S203).

The server 100 acquires the flight status information in the current flight from the UAV 300 after landing by the communication unit 103 (S204). The control unit 101 of the server 100 determines whether the acquired flight status information is similar to each route information stored in the storage unit 102 (S205). Basically, the control unit 101 determines that route information matching the route ID included in the flight status information is "similar route information." In this regard, however, even though a route ID associated with the position information $P_t$ included in the flight status information does not exist, the flight status information can be determined to be similar to the route information stored in the storage unit 102. In this case, whether the flight status information is similar to the route information stored in storage unit 102 may be determined based on the position information $P_t$ included in the flight status information or the flight trajectory constructed from the position information $P_t$.

If it is determined that the acquired flight status information is not similar to the route information stored in the storage unit 102 (S205: No), route information in the current flight is generated from the acquired flight status information. The generated route information of the new flight route is stored in the storage unit 102 (S206).

The route score included in the acquired flight status information is then associated with the stored route information (S207). Regarding the route information of the standard flight route in the current flight, the route score of the route information is updated to the route score included in the acquired flight status information (S208).

If it is determined that the acquired flight status information is similar to each route information stored in the storage unit 102 (S205: Yes), the control unit 101 checks whether the route score is recorded in the position information $P_t$ included in the acquired flight status information (S209).

If the route score is recorded in the position information $P_t$ included in the acquired flight status information (S209: Yes), the control unit 101 updates the route score of the route information of the flight route that is determined to be similar (S210). Specifically, the control unit 101 updates the route score associated with the route information of the similar flight route to the route score included in the acquired flight status information. Subsequently, regarding the route information of the standard flight route in the current flight, the control unit 101 updates the route score of the route information to the route score included in the acquired flight status information (S208).

If the route score is not recorded in the position information $P_t$ included in the acquired flight status information (S209: No), the control unit 101 decrements the route score associated with the route information of the standard flight route in the current flight (S211). This is because an event in which the flight route similar to the flight status information exists and the route score is not recorded in the position information $P_t$ appears only in the case of normal flight on the standard flight route (corresponding to the flight pattern a shown in FIG. 4). If the route score already associated with the route information of the standard flight route is "0", the route score remains to be "0" after decrementing is performed. This is to prevent the route score from becoming negative value by decrementing.

When the route score associated with the route information is updated by S208 and S211, the evaluating unit 104 newly determines a standard flight route (S212). Specifically, the evaluating unit 104 compares evaluation data of a plurality of flight routes between the two points, and sets the flight route having the highest route evaluation as the standard flight route. The flight route having the lowest route score corresponds to the flight route having the highest route evaluation described above.

For example, in the aforementioned embodiment, the evaluating unit 104 compares the respective route scores associated with the flight route, and sets the flight route having the lowest route score as the new standard flight route. As such, if the route score associated with the route information of the previous standard flight route remains to be the lowest even after the route score is updated, the same flight route is determined as the standard flight route.

In this manner, the server 100 can automatically determine the flight route and evaluate the flight route in the current flight based on the acquired flight status information. Especially as to the evaluation of the flight route, the server 100 can automatically update and determine the standard flight route after generating the route information of the new flight route.

FIGS. 11 to 15 show examples of evaluation of flight routes and update of the standard flight route when flying between two points. FIGS. 11 to 15 are obtained according to the flowchart shown in FIG. 10.

FIGS. 11 to 13 show examples of evaluation of the flight routes and the update of the standard flight route when the standard flight route is set to the route ID:1000. FIG. 11 is an example of a comparison between the flight patterns a and b. As described above, the flight pattern a is a flight pattern when the standard flight route is the route ID:1000. On the other hand, the flight pattern b is a flight pattern when a bird (moving object) appears one time in the traveling direction during the flight on the standard flight route of the route ID:1000.

As described, the difference between the flight pattern a and the flight pattern b is whether a moving obstacle exists on the standard flight route. As such, in the flight pattern a, a moving obstacle is not assumed, and thus the route score "+1" is assigned. In this regard, there is no immovable obstacle on the standard flight route of the route ID:1000. As such, the standard flight route is not changed, and the route ID:1000 is continuously set as the standard flight route.

FIG. 12 is an example of a comparison between the flight patterns a and c. The flight pattern c is a flight pattern when a flight is performed on the standard flight route of the route ID 1000 and then the route ID 1001, which is a preliminary flight route, is selected to avoid the tree T as an obstacle.

When the flight indicated in the flight pattern c is performed with the standard flight route as the route ID:1000, the tree T is an immovable obstacle on the standard flight route of the route ID:1000. As such, in the flight pattern a, the existence of the tree T as an obstacle is not assumed and the tree T needs to be avoided, and thus the root score "+10" is assigned. On the other hand, the flight pattern c flies in the route ID:1001 in all of the route consequently. This is because the flight routes from the departure point to the point indicated by the position information $P_a$ overlaps with each other in the route ID:1000 and the route ID:1001. As such, it can be said that the flight route of the route ID:1001 is a route in which the tree T is assumed to exist. That is, in the flight route of the route ID 1001, flight is performed on the flight route as shown in FIG. 4 at the point indicated by the position information $P_a$ regardless of the tree T. Accordingly, the route score of the route ID 1001 is "0".

As described above, it is necessary to avoid the tree T, an obstacle on the flight route, in the route ID:1000 (flight pattern a) that is previously the standard flight route. As such, the standard flight route is updated so as to change the standard flight route to the route ID:1001.

FIG. 13 is an example of a comparison between the flight patterns a and d. In the flight pattern d, during the flight of the standard flight route of the route ID 1000, the route ID 1001, which is a preliminary flight route, is selected in order to avoid the tree T as an obstacle. The flight pattern d is a flight pattern in which the flight is performed after the route ID:1002, which is another preliminary flight route, is selected in order to avoid the building B as another obstacle.

Similarly to the case in FIG. 12, in the flight pattern a, the tree T and the building B as obstacles are not assumed to exist, and they need to be avoided, and thus the root score "+20" is assigned. On the other hand, the flight pattern d flies in the route ID:1002 in all of the route consequently. It can be said that the flight route of the route ID:1002 flies on a route in which the tree T and the building B are assumed to exist. Accordingly, the route score of the route ID 1002 is "0".

Accordingly, the tree T and the building B, obstacles on the flight route, could be dangerous in the route ID:1000 (flight pattern a) that is previously the standard flight route. As such, the standard flight route is updated so as to change the standard flight route to the route ID:1002.

Next, FIG. 14 is a comparison example between the flight patterns c and d. That is, FIG. 14 is an example of the generation of the evaluation data of the flight route and the update of the standard flight route in the case where the standard flight route is set to the route ID:1001. When considered in the same manner as FIGS. 12 and 13, the building B as an obstacle is not assumed in the flight pattern c, and the building B needs to be avoided, and thus the root score "+10" is assigned. On the other hand, the flight pattern d flies in the route ID:1002 in all of the route, and it can be said that the flight is performed on a route in which the building B is assumed to exist. As such, the route score of the route ID 1002 is "0".

As described above, it is necessary to avoid the building B, an obstacle on the flight route, in the route ID:1000 (flight pattern a) that is previously the standard flight route. As such, the standard flight route is updated so as to change the standard flight route to the route ID:1002.

Finally, FIG. 15 is an example of a comparison between the flight patterns d and e. As described above, the flight pattern d is a flight pattern when the standard flight route is the route ID:1002. On the other hand, the flight pattern e is a flight pattern when a bird (moving object) appears one time in the traveling direction during the flight on the standard flight route of the route ID:1002.

As in the case of FIG. 11, the difference between the flight pattern d and the flight pattern e is whether a moving obstacle exists on the standard flight route. As such, in the flight pattern d, a moving obstacle is not assumed, and thus the route score "+1" is assigned. In this regard, there is no immovable obstacle other than the tree T and the building B on the standard flight route of the route ID:1002. As such, the standard flight route is not changed, and the route ID:1002 is continuously set as the standard flight route.

FIG. 16 shows an example of route information in a plurality of route IDs generated as flight routes between two points. FIG. 16 shows route information when the standard flight route is set to the route ID 1002. The route score of the route ID:1000 is updated based on the flight status information in each of the flight patterns a to e. As a result, the route score "+22" reflecting the two encounters with birds (moving objects) and the avoidance of the tree T and the building B (immovable objects) is associated with the route ID:1000. Similarly, the route score of the route ID:1001 is updated based on the flight status information in each of the flight patterns a to e. As a result, the route score "+11" reflecting the one encounter with a bird (moving object) and the avoidance of the tree T and the building B (immovable objects) is associated with the route ID:1001.

Here, one encounter with the bird (moving object) corresponds to the encounter with the bird in the position information $P_c$ in the flight pattern e. The encounter with the bird in the position information Pb in the flight pattern a is not confirmed after the flight pattern c, and thus the route scores are decremented in the route ID:1001 and the route ID:1002.

When the root scores of the root IDs 1000 to 1002 are compared, the root score of the root ID 1002 has the smallest value. According to the above, the flight route of the route ID 1002 having the smallest route score is set as the standard flight route.

FIG. 17 shows an example of aircraft information of the UAV stored in the server. Each UAV 300 is assigned with an aircraft ID for identifying the aircraft. Further, each aircraft is associated with a flight score based on performance of the aircraft, in particular, a possible flight distance. The flight score corresponds to the root score. In other words, an aircraft with which a higher flight score is associated is evaluated to be capable of landing on the destination without any trouble even in flight routes where many moving objects likely appear and flight routes where an immovable object is likely to be avoided.

On the other hand, if an aircraft with which a lower flight score is associated flies on a flight route associated with a route score equal to or higher than the flight score, there is a possibility that the aircraft may return to the departure point DEP or fall before reaching the destination point DES. As such, the selecting unit 105 of the server 100 selects the aircraft with which the flight score capable of flight without troubles is associated based on the route score associated with the route information of the standard flight route.

The flight score may be determined based on, in addition to the possible flight distance, the range and distance for detecting the obstacle, the type of the device mounted to detect the obstacle, or whether the device is mounted. For example, regarding a UAV I having a camera and an image recognition device other than a radar and a UAV II having no devices other than a radar, the flight score of the UAV I may be higher than the flight score of the UAV II.

Figure 18:
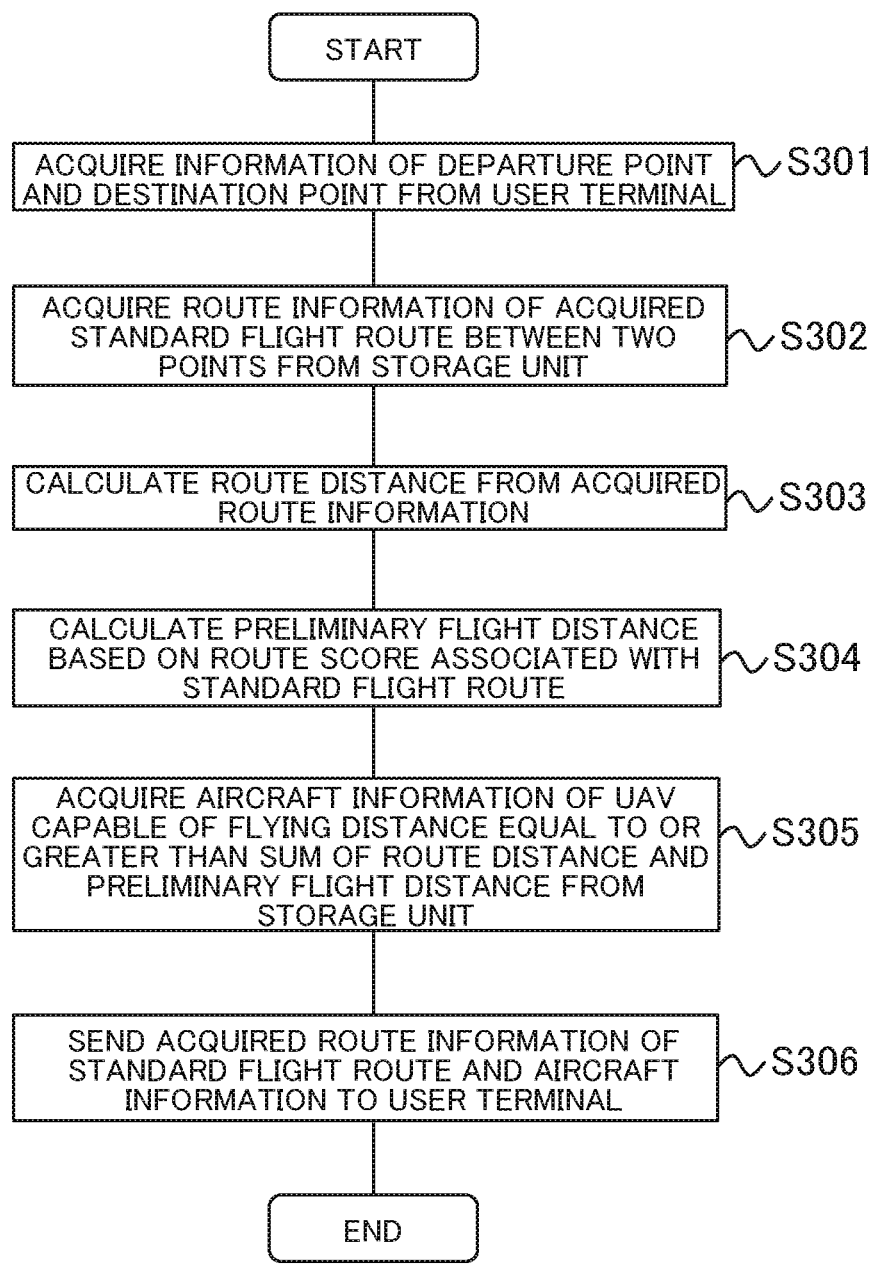
FIG. 18 is a flow chart illustrating a method in which the server selects a UAV to be recommended for use.

FIG. 18 is a flow chart illustrating a method in which the server 100 selects a UAV 300 to be recommended for use. The server 100 acquires information of the departure point DEP and the destination point DES from the user terminal 200 by the communication unit 103 (S301). The information of the departure point DEP and the destination point DES may be acquired from the flight request from the user.

Next, the control unit 101 of the server 100 acquires route information of the acquired standard flight route between the two points from the storage unit 102 (S302). Then, the evaluating unit 104 of the server 100 calculates a route distance from the acquired route information (S303). If the acquired route information includes the calculated route distance in advance, the value of the route distance is acquired.

The evaluating unit 104 of the server 100 calculates a preliminary flight distance based on the route score associated with the route information of the standard flight route, separately from the route distance in S303 (S304). This is because, in the case of the flight on the standard flight route, there is a possibility of flying a distance longer than the route distance described above in order to avoid the obstacle, for example. An example of the method of calculating the preliminary flight distance is multiplying the route score by a unit distance with respect to the route score (preliminary flight distance coefficient). For example, if the preliminary flight distance coefficient is 2 km, the preliminary flight distance for the flight route of the route score "+2" is 4 km, and the preliminary flight distance for the flight route of the route score "+11" is 22 km.

As another example, different preliminary flight distance coefficients may be set for hovering in encountering with a moving object and for avoiding an immovable object. For example, a first preliminary flight distance coefficient applied when hovering in encountering with a moving object may be set to 200 m (0.2 km), and a second preliminary flight distance coefficient applied when avoiding an immovable object may be set to 2 km. In this case, the preliminary flight distance in the flight route of the route score "+12" is calculated as 0.2×2+2×10=20.4 [km].

Subsequently, the selecting unit 105 of the server 100 acquires, from the evaluating unit 104, the route distance calculated in S303 and the preliminary flight distance calculated in S304. The selecting unit 105 then acquires, from the storage unit 102, the aircraft information of the UAV 300 capable of flying a distance equal to or greater than the sum of the route distance and the preliminary flight distance (S305). Specifically, by referring to the aircraft information of the UAV 300 as shown in FIG. 17, the selecting unit 105 acquires the aircraft information of the aircraft capable of flying a distance equal to or greater than the sum of the route distance and the preliminary flight distance.

The acquired aircraft information of the UAV 300 together with the route information of the standard flight route is sent to the user terminal 200 by the communication unit 103 (S306). The transmitted route information and the aircraft information of the UAV 300 are received by the communication unit 203 of the user terminal 200 and displayed on the display unit 205.

Figure 19:
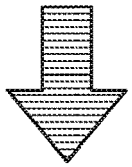
FIG. 19 is a diagram illustrating an example of a case where the aircraft information of the UAV recommended for use is displayed on a display unit of the user terminal.

FIG. 19 shows an example of a case where the aircraft information of the UAV 300 recommended for use is displayed on the display unit 205 of the user terminal 200. The user inputs information of the departure point DEP and the destination point DES on the screen at the time of sending "flight request" using the user terminal 200.

The "flight request" screen of FIG. 19 shows, as an example of input, a method of selecting a departure point DEP and a destination point DES from registered candidates using a pull-down menu. Other than the input using the pull-down menu, text boxes for inputting the departure point DEP and the destination point DES may be prepared respectively, and the user may input the departure point DEP and the destination point DES by using the operation unit 204 of the user terminal 200. The information of the departure point DEP and the destination point DES entered by the user is transmitted from the communication unit 203 of the user terminal 200 to the server 100 via the network N.

Subsequently, the selecting unit 105 of the server 100 acquires the aircraft information of the UAV 300 that is recommended for use in this flight from the storage unit 102 based on the flowchart shown in FIG. 18. The route information and the acquired aircraft information of the UAV 300 are transmitted from the communication unit 103 of the server 100 to the user terminal 200. The user terminal 200 displays the route information of the standard flight route and the aircraft information of the UAV 300 received from the server 100 by communication unit 203 on the display unit 205 as "flight route/recommended aircraft information".

The "flight route/recommended aircraft information" screen of FIG. 19 shows an example in which the "business office A of Company X" is selected as the departure point and the "branch office B of Company Y" is selected as the destination point. Under the display of the departure point and the destination point selected by the user, the route information of the standard flight route between the two selected points is displayed. Here, the flight routes between the selected two points are the route IDs 1000 to 1002 described above. In this case, the route ID 1002 is the standard flight route as shown in FIG. 16, and thus the route information of the route ID 1002 is displayed as the standard flight route.

Three types of drones (drone C, drone D, drone E) out of the UAVs 300 are shown as the aircrafts recommended for use in the standard flight route here. As shown in FIG. 16, the flight distance in the flight route of the route ID 1002 is originally 25 km, but the route score "+1" is associated. As such, the drone B capable of flying 25 km as shown in FIG. 17 may not be able to land on the destination, and thus is not displayed on the "flight route/recommended aircraft information" screen of FIG. 19.

As described above, the user can use the evaluation data of the flight route and the setting of the standard flight route, which are automatically updated by the evaluating unit 104 of the server 100. Further, the user can acquire and refer to the aircraft information of the UAV 300 that is recommended for use by the selecting unit 105 of the server 100. Further, based on the referred information, the user can operate an appropriate UAV 300 to fly in accordance with environmental changes on the flight route and around the flight route.

The present disclosure updates the evaluation of the flight route for each flight, and thus there may be a flight route having a route score that continues to be "0" even after many flights, depending on the environment on the flight route. In such a case, it is very unlikely that an obstacle exists on the flight route. As such, the evaluating unit 104 of the server 100 allows the use of the UAV 300 (second UAV) that does not have an obstacle detection function (sensor unit 305 shown in FIG. 1) for the flight on the flight route with which the route score "0" is associated. In this way, in the case where the evaluating unit 104 allows the use of the UAV 300 that does not have the obstacle detection function, the selecting unit 105 may select the UAV 300 to be recommended for use based on the distance of the flight route regardless whether the obstacle detection function is mounted. Specifically, in the "flight route/recommended aircraft information" screen shown in FIG. 19, the aircraft information of the aircraft IDs: A (drone A) and B to E (drones B to E) shown in FIG. 17 is displayed as the aircraft information selected by the selecting unit 105.

In the present disclosure, even if the UAV 300 has not been flying on a standard flight route between the two points for a period of time, such flight route can be evaluated. As described above, if the UAV 300 has not been flying on a standard flight route for a period of time, the evaluating unit 104 of the server 100 increases the route score associated with the route information of the standard flight route according to the period in which the UAV is not flied.

As an example, a case will be described in which a flight between the two points has not been performed for 26 weeks (i.e., 6 months). In this case, the route score associated with the route information of the standard flight route between the two points may be incremented every two weeks, for example. As such, the evaluation unit 104 sets a value obtained by adding "+13" to the route score associated with the route information of the previous standard flight route as a new route score. The selecting unit 105 then selects a UAV 300 based on the new route score. Subsequently, the aircraft information of the selected UAV 300 is displayed on the "flight route/recommended aircraft information" screen of FIG. 19.

In this way, by increasing the route score according to the non-flying period, the possibility of a risk that a new obstacle (e.g., a newly constructed building) appears in such a period can be reflected to the standard flight route before resuming the flight. In the first flight after the flight is resumed, the UAV 300 associated with the flight score equal to or higher than the route score reflecting the risk is selected as a UAV to fly on the standard flight route. This allows the UAV to land on the destination ensuring the sufficient flight distance, and also enables the standard flight route to be automatically evaluated again.

In the above embodiment, an example has been described in which the functions of the evaluating unit 104 and the selecting unit 105 are provided in one device, i.e., the server 100, although the present technique is not limited to such an example. For example, the functions of the evaluating unit 104 and the selecting unit 105 may be provided in different devices. In this case, the evaluation data is transmitted from the device having the function of the evaluating unit 104 to the device having the function of the selecting unit 105, whereby the functions the same as those of the embodiment described above may be implemented.

The user may select the UAV 300 to fly on the flight route. For example, the evaluation data generated by the evaluating unit 104 is transmitted from the server 100 to the user terminal 200. The evaluation data received by the user terminal 200 is displayed on the display unit 205. The user can check the evaluation data displayed on the display unit 205 and select the UAV 300 to fly on the flight route. The information of the UAV 300 selected by the user may be entered via the operation unit 204 and transmitted from the user terminal 200 to the server 100.

The specific character strings, numerical values, and specific character strings and numerical values in the drawings described above are illustrative only, and are not limited to these character strings and numerical values.

What is claimed is:

1. A management device that manages a flight route of a plurality of unmanned aerial vehicles (UAVs), comprising at least one processor configured to:
acquire a detection result of an obstacle by a first UAV including an obstacle detection function; and
generate evaluation data of the flight route for selecting a UAV from among the plurality of UAVs to fly on the flight route based on the detection result;
generate the evaluation data in which a route score is associated with the flight route,
select a UAV to fly on the flight route;
wherein the UAV is selected based on the route score assigned to the flight route and a flight score that is set for each UAV in advance;
wherein the flight score is based on a characteristic of the UAV;
wherein the at least one processor is further configured to select a UAV with a flight score equal to or higher than the route score;
change the route score to be larger than the flight score if it is determined that there is no flight route that enables the UAV to land at a destination point of the flight route;
transmit the flight route to the selected UAV;
wherein the selected UAV travels according to the flight route.

2. The management device according to claim 1, wherein the at least one processor is configured to generate the evaluation data based on whether an obstacle is detected in the acquired detection result.

3. The management device according to claim 1, wherein the at least one processor is configured to generate the evaluation data based on a type of an obstacle detected in the acquired detection result.

4. The management device according to claim 3, wherein the at least one processor is configured to generate the evaluation data based on whether the obstacle is a moving object or an immovable object.

5. The management device according to claim 1, wherein in a case where the first UAV flies on a second flight route so as to avoid an obstacle detected during flight of the first flight route, the at least one processor is configured to generate both the evaluation data of the first flight route and the evaluation data of the second flight route.

6. The management device according to claim 1, wherein the at least one processor is configured to select a second UAV including no obstacle detecting function as a UAV that flies on the flight route to which the route score indicating that an obstacle is unlikely to exist on the flight route is assigned.

7. The management device according to claim 1, wherein the at least one processor is configured to update the generated evaluation data based on the detection result.

8. The management device according to claim 7, wherein the at least one processor is configured to update the generated evaluation data in each flight of a plurality of UAVs.

9. The management device according to claim 7, wherein the at least one processor is configured to update the generated evaluation data of the flight route according to a period during the flight route is not flown by the plurality of UAVs.

10. The management device according to claim 1, wherein the flight score is set based on at least one of (i) size of range to detect obstacles by the UAV, (ii) distance of range to detect obstacles by the UAV, (iii) type of a device mounted on the UAV to detect obstacles, and (iv) whether a device is mounted on the UAV to detect obstacles.

11. The management device according to claim 1, wherein the at least one processor is configured to recommend a UAV based on the evaluation data.

12. The management device according to claim 1, wherein the route score is increased more by an immovable obstacle than a movable obstacle.

13. The management device according to claim 1, wherein the flight score is based on obstacles in the flight route.

14. The management device according to claim 1, wherein the at least one processor is configured to determine the maximum distance of the flight route.

15. A management method for managing a flight route of a plurality of UAVs, comprising:
acquiring a detection result of an obstacle by a first UAV including an obstacle detection function; and
generating evaluation data of the flight route for selecting a UAV from among the plurality of UAVs to fly on the flight route based on the detection result;
generating the evaluation data in which a route score is associated with the flight route,
selecting a UAV to fly on the flight route;
wherein the UAV is selected based on the route score assigned to the flight route and a flight score that is set for each UAV in advance;

wherein the flight score is based on a characteristic of the UAV;

wherein the method further comprises selecting a UAV with a flight score equal to or higher than the route score;

changing the route score to be larger than the flight score if it is determined that there is no flight route that enables the UAV to land at a destination point of the flight route;

transmitting the flight route to the selected UAV;

wherein the selected UAV travels according to the flight route.

16. A management system that manages a flight route of a plurality of UAVs, comprising:

a first UAV including an obstacle detection function; and a management device comprising at least one processor configured to:

acquire a detection result of an obstacle by the first UAV; and generate evaluation data of the flight route for selecting a UAV from among the plurality of UAVs to fly on the flight route based on the detection result;

generate the evaluation data in which a route score is associated with the flight route, select a UAV to fly on the flight route;

wherein the UAV is selected based on the route score assigned to the flight route and a flight score that is set for each UAV in advance;

wherein the flight score is based on a characteristic of the UAV;

wherein the at least one processor is further configured to select a UAV with a flight score equal to or higher than the route score;

change the route score to be larger than the flight score if it is determined that there is no flight route that enables the UAV to land at a destination point of the flight route;

transmit the flight route to the selected UAV;

wherein the selected UAV travels according to the flight route.

\* \* \* \* \*